April 9, 1946.  F. TROSTLER ET AL  2,398,127
SEPARATION OF SOLID MATERIALS OF DIFFERENT SPECIFIC GRAVITY
Filed June 14, 1943
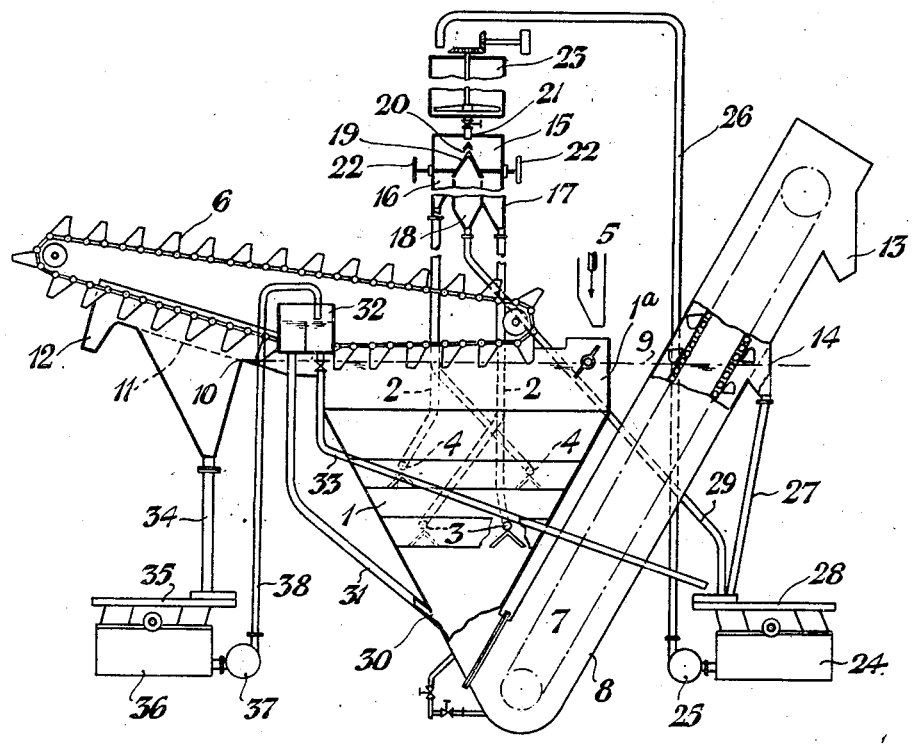
Inventors
Frederick Trostler,
Thomas Andrews
by Sommers-Young
Attorneys Patented Apr. 9, 1946

2,398,127

UNITED STATES PATENT OFFICE 2,398,127

SEPARATION OF SOLID MATERIALS OF DIFFERENT SPECIFIC GRAVITY

Fredrick Trostler and Thomas Andrews, Whitford, near Holywell, North Wales, assignors to The Sink and Float Corporation, New York, N. Y., a corporation of New York Application June 14, 1943, Serial No. 490,826
In Great Britain June 17, 1942

4 Claims. (Cl. 209—173)

This invention relates to the separation of solid materials of different specific gravities by the sink-and-float method, in which the heavy separating medium comprises a suspension of insoluble solid particles in a liquid. The principal object of the invention is the provision of improvements in such processes whereby a desired degree of stability of heavy separating media of the suspension type may be secured and maintained in use. The invention relates specifically to such processes of the type in which a current is caused to flow upwardly through a considerable portion of the height of the separating vessel, and in such processes the rate of flow of such current may be reduced to a small figure by the practice of the invention, while the density differential from top to bottom of the separating vessel is maintained at a desired small figure, with various advantages hereinafter referred to.

The suspensions which are used in the present process are of the relatively stable class which can be utilised in a separating vessel without agitation, which tend to settle slightly under quiescent conditions, at a rate which can readily be determined. With such media, as is explained in Patent No. 2,349,528, May 23, 1944, of the present applicants, the slight inherent tendency of the medium to destabilisation can be overcome to a sufficient extent by the use of slight vertical currents, the velocity of which is calculated to stabilise the medium with a desired small density differential from top to bottom of the separator. Thus, for example, as is described in said application, a suitable suspension medium may be stabilised so as to provide a density differential from top to bottom of the separator of the order of 0.01 to 0.02, by the use of a downward current caused by withdrawing medium continuously from the bottom. It should be understood that the density differential provided may be smaller or larger in accordance with the closeness of separation of marginal density particles required in a particular operation, the essential requirement being that the density of the medium in the lower part of the separating vessel is to be less than the density of each particle which it is desired to recover as "sink."

It will be apparent that the term "suspension" is used herein in a relative sense, that is to say, as indicating a separating medium composed of insoluble solid particles dispersed in a liquid, usually water, as contrasted with media consisting of true liquids of the desired density or of solutions of similar density, which can also be used in sink and float separation processes but have no connection with the present invention.

In one specific process described in the aforesaid specification, the stabilising current flowed downwardly through the greater part of the separating vessel and an additional supply of medium, diluted to a density less than that of the main medium feed (which was admitted near the top), was continuously admitted near the bottom of the vessel. This had the effect of reducing the density differential in the vessel or of permitting the maintenance of a desired differential with downward current flowing at a reduced or comparatively low rate.

In the present process a current is produced in the bath of medium, flowing upwardly through a considerable part of the depth of the bath, and a supply of liquid additional to and of a less density than the ordinary medium feed is introduced at a suitable point or points in the lower part of the bath or body of medium, the operations being carried out in such manner that a slight desired density differential is maintained in the bath with very low velocity of the upward current. This additional liquid may in some cases be admitted at a comparatively modest rate.

The procedure involved in the maintenance of such a slight density differential as above referred to provides a desirable density equalisation process for the medium baths used for sink-and-float separation. Thus, the introduction of the supply of additional liquid (under which term is not only included additional medium of less density as referred to, but also addition of water which may alternatively be used in suitable cases), in the manner described is very advantageously capable of preventing any sensible departure from initial conditions which may have been pre-determined as appropriate so that there is possible a constant equalisation of the density setting of the bath and consequent stabilisation of the medium thereof at the slight density differential.

Various advantages of the procedure of the present invention will be referred to hereinafter.

As mentioned above, our said patent established the principle that separating media of the suspension type therein described may be stabilised to provide a desired small density differential from top to bottom of the bath, by the use of a vertical flow of a velocity calculated to produce such differential. It has been established that this effect can be obtained with upward currents as well as with downward currents. Where downward currents are used, their strength is limited by the downward drag that they, if too strong, might exert on float particles of the materials being separated, forcing some of them, having densities only slightly less than that of the medium, to descend and dilute the sink product. Similarly, where upward currents are used, their velocity must not exceed the falling velocity of the particles which are to be recovered as "sink" or concentrates, as otherwise the assay of the "float" or tailings would be too high because of such particles being pushed up into the "float."

The present invention may be regarded, in one specific embodiment, as an improvement upon the process described in the patent of A. Pearson No. 2,191,805, granted Feb. 27, 1940. According to that patent, upward current, devised to be of substantially uniform strength throughout the whole width and the whole depth (above the medium admission inlets or tuyères) of the bath of medium, can be used of a strength just sufficient to counteract the downward drag of the comparatively large sink particles upon suspended constituents of suspension type media. Such a slight upward velocity, however, might be insufficient to stabilise the medium with the slight density differential from top to bottom, (such, for example, as one of the order of 0.01 to 0.02) which is now considered to be an essential pre-requisite of accurate separation, where intermediates, differing very slightly in density from the upper portion of the bath or body of medium, are to be recovered as "sink."

In accordance with the present invention, the introduction of dilute medium (or other diluent) into the lower portion of the separating vessel enables the upwardly flowing currents to be reduced in velocity to a very marked degree while still enabling the density differential in the separating vessel to be maintained at the desired small figure. Thus the upward current may be reduced to a velocity which (but for the use of the additional dilute medium) would result in stratification, expressed by a density differential of the order of, for example, 0.1 between the top and bottom of the separating vessel. By the admission of additional dilute medium as described, at a comparatively small rate, however, the density differential may be kept down as desired, say to a figure of the order of 0.01–0.02 or even smaller, while keeping the upward velocity low as described. The reduction in the velocity of the upward currents has the obvious advantage that practically no intermediate density particles will be pushed up into the float material. The invention thereby achieves, in comparison with other upward current methods, higher recoveries of the economic minerals or constituents, both because of the refined separation made possible by a slight density differential, and because of the facts that no intermediate density sink material is pushed up into the float material, the descent of none of the same through the bath is prevented, and the advantage of a slight upward current in preventing down drag of certain sink particles on medium particles, with consequent destabilising tendency, is retained.

The improved process may be practised by means of apparatus of the nature, for example, of that described in said Patent 2,191,805, or the said Patent No. 2,349,528, or the Patent No. 2,345,513, March 28, 1944, of the present applicants and W. R. Skelton, with such modifications as may be necessary to produce the conditions above described. With the construction of said Patent 2,191,805, there would be a pipe connection to the separating vessel, at a relatively low point, opposite to where the vessel opens into the "sink" elevator casing, for supplemental feed of liquid medium of less density than the main feed medium (or other suitable diluent). It is desirable in some cases that the supply of supplemental feed should come from the boom discharge of the separator.

Attention is hereby directed to the accompanying drawing illustrating, by way of example, one form of apparatus by which the process may be practised. In the drawing, the figure is an elevation, partly in section, of separating apparatus similar to that described in said Pearson patent, modified in the manner above referred to.

Referring to the drawing, the main medium feed is shown as being supplied to the separating vessel, 1, which may be as shown of a downwardly tapering form, rectangular in plan, and having a shallow vertically-sided top part 1ª where feed of ore and removal of float material takes place, by means of a series of pipes, 2, which enter the bath of medium from above and terminate in horizontal rows of inlets at different levels in the vessel, these levels all being situated, generally speaking, at a depth more than one third the height of the body of medium below the upper surface thereof. As shown, there may be a row of two inlets, 3, on either side of the vessel at a level about midway of the depth of the tapering part thereof, and another row of inlets, 4, at a level nearer to the top of the tapering part. Ore or other material to be separated is shown as fed on to the top of the body of medium, at 5. "Float" particles may be removed from the top of the bath by suitable means, such as the continuous rake conveyor, 6, while "sink" particles are removed from the bottom of the separator by the bucket conveyor, 7, in the usual elevator casing, 8. The level of medium in the separator and the elevator casing is indicated at 9. The tailings or "float" together with some medium pass over the "boom" indicated at 10 and over a drainage screen, 11, to a discharge chute, 12, the concentrates or "sink" being discharged from the top of the elevator casing through chute, 13. Medium discharges continuously over the boom, 10, and over the weir, 14, in the casing, 8, current flowing upwardly in the separator from the lowest level of admission orifices, 3, and downwardly in the bottom portion of the separator, below that level.

In the arrangement shown, a tank, 15, is shown for supplying the pipes 2, divided into three compartments, namely, 16, at the highest level, serving the pipes for the upper inlets 4, 17, serving the pipes for the lower inlets 3, and 18, which is for the return of surplus liquid. The bottom of the compartment 16 may be elevated with respect to the bottom of compartment 17 by a distance approximately equal to the difference in level of the two sets of inlets, 4, 3, so that the pipes 2 may contain columns of substantially uniform height with respect to the inlets. However, as the effective liquid heads of the columns in pipes 2 are relative to the upper surface of the liquid in separator 1, the pipe 2 leading from compartment 16 will have a higher head and, other conditions being equal, will introduce more liquid into vessel 1 than the pipe leading from compartment 17.

In order to control the liquid heads of pipes 2 and thus the quantities of medium introduced into the separator at the several levels, medium may be distributed to the several compartments by a swingable device comprising a pair of plates 19 depending from an axis 20 disposed directly below the pipe 21 supplying liquid to tank 15. These plates are adjustable on their axis from outside the tank by screw-handles 22 so that heavy liquid from pipe 21 may be directed in desired quantities to the outer compartments 16, 17, the remainder passing to the middle compartment 18. These plates 19 can be readily adjusted so that they just keep the pipes 2 full.

The tank 15 is shown as fed from a vessel 23 above the same, to which medium may be supplied from tank 24 by a pump 25 and pipe line 26.

Liquid overflowing from weir 14 may be delivered as by pipe 27 to an impact screen 28 for removal of solid matter and similarly the surplus heavy liquid from compartment 18 of tank 15 may be led to screen 28 by pipe 29 as shown. Medium draining from the concentrates screen (not shown) may be led similarly to screen 28, through which medium drains to tank 24, from which the main feed pipe 26 is supplied. An overflow weir may also be provided on the separating vessel 1, if desired, as shown in said Pearson Patent, but is not shown as it does not seem necessary.

The medium feeding arrangements above described are as shown in said Pearson patent. Additionally, we continuously introduce dilute medium or other suitable liquid of reduced density into the lower part of the separator, as shown at 30. This is conveyed by pipe 31 from a suitable source of supply. This diluent for the medium may be, as shown, derived from the boom discharge of the separator, this arrangement being particularly suitable when the ore or other material treated contains more or less water, so that the boom discharge is diluted thereby. This dilute medium may be supplied under appropriate slight head to the opening 30 in the separator. The arrangement for accomplishing this may comprise, as illustrated, a small tank, 32, positioned above the separator 1 at a slight distance above the medium level therein, this tank being supplied with dilute medium from the boom discharge, pipe 31 leading to the bottom of the separator from the bottom of tank 32, while surplus from the latter is led by pipe 33 to screen 28 and tank 24 and thence to the main feed. The boom discharge passes from drainage screen 11 by pipe 34 to impact screen 35, and the medium passing through the latter drops into tank 36, from which it is pumped by pump 37 and pipe 38 to the small tank 32.

The process may be practised as follows: The main feed medium is introduced continuously into the separator through inlets 3 and 4, so as to cause a slight upward current in the separator from the lower level of inlets. This current, in the construction shown, is of substantially uniform strength throughout the depth and cross section of all of the body of medium above said inlets. This is accomplished, as explained in said Pearson patent by the arrangement of the inlets and supply thereto, the volume admitted at each level in the tapering vessel depending upon the increase of cross-sectional area of the body of liquid at that level over that at the next lower level of admission.

The dilute medium is also introduced continuously into the separator at the point 30, thus modifying the conditions in the separator as explained. Part of the medium is discharged continuously, with separated "float" material, over the boom 10, while another part is discharged continuously at the bottom, that is, over the weir 14 in the elevator casing. The upward current in the separator, in the form of the process specifically described, may be substantially just sufficient in strength to neutralize downward drag effects and cross currents produced by the fall of heavy particles through the medium, as stated in said Pearson Patent No. 2,191,805. Suitably, the volume of dilute medium introduced may wholly or in large part be discharged over the weir or weirs, which may also be expressed by saying that the quantity of medium discharged over the boom would be less than the quantity of dilute medium admitted, per unit of time. Similarly, the boom discharge may be less than half the volume of feed medium plus dilute medium admitted. The extent of dilution of the dilute or density-equalisation medium may be determined by experience, to produce the desired effect, but a useful method, when operating on moist raw materials and in which consequently water is discharged over the boom with the float (the density of this dilute medium thus discharged being held to within, say, 0.03 below the density of the feed medium), is to use this dilute medium for introduction into the lower part of the separating vessel. By this procedure sufficiently strong upward currents will be produced to counteract the down drag effect referred to in said Patent No. 2,191,805, while at the same time in spite of the extreme feebleness of such currents the beneficial extremely small density differential, such as above described, can readily be maintained.

The statement in the last preceding paragraph is given purely by way of example. More generally it may be said that the upward current from the admission inlet or inlets is to be maintained at a rate of flow which, in conjunction with the rate of admission and extent of dilution of the dilute or density-equalising medium, will give an upward flow at a rate sufficient to stabilise the medium in the separator at any small density differential required for a particular separating operation, care being always taken that the upward velocity is insufficient to push any intermediate density sink material up into the float.

Apart from the operational and metallurgical advantages described above, economic advantages also result from the employment of the new or improved process in that pumping costs can be substantially reduced. The pumping of the heavy medium to a point above the medium level in the separating vessel (as described for example in the said Patent No. 2,191,805, sufficiently high to ensure the uniform distribution through the tuyères, as specified in the said specification, forms a substantial item in the operating costs, not only on account of the high power consumption entailed in lifting heavy liquids to such a height, but also on account of the comparatively abrasive nature of the medium which results in heavy maintenance costs for the pumps. A considerable reduction in the medium circulation is, therefore, an economic advantage. The dilute medium flowing from the boom, part of which is introduced at the bottom of the separating vessel, requires elevation to only a few inches above the medium level in the separating vessel, which ensures a gentle flow into the bottom of the vessel, and the introduction of this dilute medium as described permits the volume of medium pumped up to the upper supply tank (for example, the tank 23 in the drawing) to be reduced.

Two further advantages of the described process may be mentioned. The reduction of the rate of medium circulation obtained results in a less quantity of the suspended solids in the medium being subjected to attrition in the passage of the medium through the pump and the pipes and other parts of the circulating system. Therefore, reconditioning of the medium (by way of removal of the products of attrition) will be required to a less extent.

The other further advantage referred to holds good only when the dilute medium admitted is taken from the boom discharge or, generally speaking, from the top portion of the body of medium. The settling of a suspension medium to whatever extent, which has been referred to herein in terms of the density differential from top to bottom of the separator, has the further effect of causing a certain variation in the size distribution of the suspended particles from top to bottom. That is to say, larger particles tend, to some extent, to segregate towards the bottom, while the suspension tends to increase at the top, in the percentage of finer particles. It will be seen that these tendencies may be corrected to a considerable extent by introducing at the bottom some of the medium taken from the top, so that not only is the density differential reduced, but the maldistribution of size particles is also corrected.

We claim:

1. The process of separating solid materials of different specific gravities according to the sink-and-float method, which comprises, feeding material to be separated to the top region of a body of separating medium comprising a suspension of comminuted solids in a liquid which settles at a slight rate in the absence of currents, continuously introducing medium into said body at a level thereof situated more than one third the height of said body below the top thereof, continuously introducing a diluent for said medium comprising a liquid of lower density than said medium into said body at a level thereof lower than the level above-mentioned, withdrawing medium continuously from the top and from the bottom of said body and removing "float" particles from the top and "sink" particles from the bottom of said body, and adjusting the rate of withdrawal of medium from the top and the rate of introduction of said diluent into said body to cause an upward current from said medium admission level at a rate less than the falling velocity of marginal density particles therein which are to be recovered as "sink" but sufficient to maintain a desired small density differential from top to bottom of said body, with a density in the lower part of said body less than that of said marginal density particles.

2. The process of separating solid materials of different specific gravities according to the sink-and-float method, which comprises, feeding moist material to be separated to the top region of a body of separating medium comprising a suspension of comminuted solids in a liquid which settles at a slight rate in the absence of currents, continuously introducing medium into said body at a level thereof situated more than one third the height of said body below the top thereof, continuously withdrawing medium and removing "float" particles from the top and continuously withdrawing medium and removing "sink" particles from the bottom of said body, continuously introducing a portion of the medium withdrawn from the top of the body, diluted with water from said material, into said body at a level thereof lower than the level above mentioned, and adjusting the rate of withdrawal of medium from the top and the rate of introduction of medium from the top into said body at the lower level above mentioned to cause an upward current from said medium admission level at a rate less than the falling velocity of marginal density "sink" particles therein but sufficient to maintain a desired small density differential from top to bottom of said body, with a density in the lower part of said body less than that of said marginal density particles.

3. The process of separating solid materials of different specific gravities according to the sink-and-float method, which comprises, feeding material to be separated to the top region of a body of separating medium comprising a suspension of comminuted solids in a liquid, which settles at a slight rate in the absence of currents, continuously introducing medium into said body at a plurality of levels thereof below the point of feed of material to be separated at points horizontally distributed at each of said levels, the lowermost of said levels being situated more than one third the height of said body below the top thereof, continuously introducing a diluent for said medium comprising a liquid of lower density than said medium, into said body at a level thereof lower than the lowest level above mentioned, withdrawing medium continuously from the top and bottom of said body and removing "float" particles from the top and "sink" particles from the bottom of said body, and adjusting the rate of withdrawal of medium from the top and the rate of introduction of said diluent into said body to cause an upward current from the lowest of said plurality of medium admission levels at a rate less than the falling velocity of marginal density particles therein which are to be recovered as "sink" but sufficient to maintain a desired small density differential from top to bottom of said body, with a density in the lower part of said body less than that of said marginal density particles.

4. In a process of separating solid materials of different specific gravities according to the sink-and-float method, in which material to be separated is fed to the upper region of a body of separating medium comprising a suspension of comminuted solids in a liquid, which suspension in the absence of currents therein settles sufficiently to produce a downward differential from top to bottom thereof with the density at the bottom greater than that of certain marginal density particles the recovery of which as "sink" is desired, and in which process "float" particles are continuously withdrawn at the top, and "sink" particles at the bottom, the steps comprising, continuously admitting medium into said body at more than one third the height thereof below the top thereof and withdrawing medium at the top and bottom thereof, at rates of admission and top withdrawal such as to produce an upward current in said body of less than the falling velocity of desired marginal density "sink" particles and to produce a less density differential therein than that produced in the absence of currents but in which the density at the bottom is greater than that of such particles, continuously introducing a diluent for said medium of density lower than that of said medium into the lower part of said body, and regulating the rates of introduction of said diluent and of the withdrawal of medium at the top and bottom of the body to maintain said current in said body at a rate less than the falling velocity of said marginal density particles, but to produce a less density differential in said body than that produced in the absence of such diluent, with the density in the lower part of said body less than that of said marginal density particles.

FREDRICK TROSTLER.
THOMAS ANDREWS.